United States Patent
Lv

(10) Patent No.: US 9,948,147 B2
(45) Date of Patent: Apr. 17, 2018

(54) MAGNETIC RESONANCE TYPE WIRELESS CHARGING CIRCUIT

(71) Applicant: BOE TECHNOLOGY GROUP CO., LTD., Beijing (CN)

(72) Inventor: Xuewen Lv, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 109 days.

(21) Appl. No.: 15/112,103

(22) PCT Filed: Oct. 16, 2015

(86) PCT No.: PCT/CN2015/092093
§ 371 (c)(1),
(2) Date: Jul. 15, 2016

(87) PCT Pub. No.: WO2017/000428
PCT Pub. Date: Jan. 5, 2017

(65) Prior Publication Data
US 2017/0149281 A1    May 25, 2017

(30) Foreign Application Priority Data
Jun. 30, 2015 (CN) .......................... 2015 1 0375349

(51) Int. Cl.
*H02J 7/00* (2006.01)
*H01F 27/42* (2006.01)
(Continued)

(52) U.S. Cl.
CPC ............. *H02J 50/12* (2016.02); *H02J 7/025* (2013.01)

(58) Field of Classification Search
CPC .................................. H02J 50/12; H02J 7/025
(Continued)

(56) References Cited

U.S. PATENT DOCUMENTS 4,912,374 A * 3/1990 Nagase ............... H05B 41/2928
                                                                315/226
5,764,496 A * 6/1998 Sato ....................... H02M 1/425
                                                                363/124
(Continued)

FOREIGN PATENT DOCUMENTS

CN       201113482 Y       9/2008
CN       102857134 A       1/2013
(Continued)

OTHER PUBLICATIONS

Cai, Chaoguo, "Research on Design on an 80th Multiplier Chain Circuit", University of Electronic Science and Technology of China, Master Dissertation, Apr. 2009, 72 pages.

(Continued)

*Primary Examiner* — M'Baye Diao
(74) *Attorney, Agent, or Firm* — Kinney & Lange, P.A.

(57) ABSTRACT

The present disclosure provides a magnetic resonance type wireless charging circuit, and belongs to the field of wireless charging technology. The magnetic resonance type wireless charging circuit comprises: a high frequency oscillation circuit configured to generate an initial oscillation signal; and a driving circuit configured to generate a transmission signal using the initial oscillation signal; wherein the driving circuit comprises one stage of driving sub-circuit or n stages of driving sub-circuits with (n−1) stages of Direct Current (DC) blocking circuits serially connected thereamong in an alternate manner, where n≥2 and n is an integer, and each stage of driving sub-circuit comprises a frequency doubling circuit and a first frequency selection circuit which are connected in series. In the present disclosure, the frequency of the initial oscillation signal generated by the high frequency oscillation circuit is doubled, so as to increase the frequency of the transmission signal and ensure a transmission distance of the transmission signal, thereby ensuring the (Continued)

effects of wireless charging. When the frequency of the transmission signal is required to reach a certain value, the requirements for switch transistors are reduced, and a wireless charging circuit with good effects can be achieved by using cheap switch transistors, thereby reducing production cost of the wireless charging circuit.

24 Claims, 3 Drawing Sheets

(51) Int. Cl.
 *H02J 50/12* (2016.01)
 *H02J 7/02* (2016.01)
(58) Field of Classification Search
 USPC .................. 320/108; 307/104; 455/41.1, 573
 See application file for complete search history.

(56) References Cited

U.S. PATENT DOCUMENTS

| | | | |
|---|---|---|---|
| 5,920,155 A * | 7/1999 | Kanda | H05B 41/295 |
| | | | 315/209 R |
| 5,945,783 A * | 8/1999 | Schultz | H05B 41/2827 |
| | | | 315/219 |
| 5,959,410 A * | 9/1999 | Yamauchi | H05B 41/28 |
| | | | 315/209 R |
| 8,559,193 B2 * | 10/2013 | Mazumder | H02M 7/4807 |
| | | | 363/132 |
| 9,496,721 B2 * | 11/2016 | Kobayashi | B60L 11/182 |
| 2011/0181123 A1 | 7/2011 | Ichikawa | |
| 2011/0254377 A1 * | 10/2011 | Wildmer | B60L 11/182 |
| | | | 307/104 |
| 2012/0217926 A1 | 8/2012 | Yoon et al. | |
| 2014/0300274 A1 * | 10/2014 | Acatrinei | H05B 33/0815 |
| | | | 315/85 |

FOREIGN PATENT DOCUMENTS

| | | |
|---|---|---|
| CN | 104901439 A | 9/2015 |
| WO | 2012091210 A1 | 5/2012 |

OTHER PUBLICATIONS

First Chinese Office Action, for Chinese Patent Application No. 201510375349.8, dated Aug. 19, 2016, 15 pages.
Second Chinese Office Action, for Chinese Patent Application No. 201510375349.8, dated Jan. 26, 2017, 14 pages.
International Search Report and Written Opinion (including English translation of Box V) dated Mar. 24, 2016, for corresponding PCT Application No. PCT/2015/092093.

* cited by examiner

MAGNETIC RESONANCE TYPE WIRELESS CHARGING CIRCUIT

CROSS-REFERENCE TO RELATED APPLICATION(S)

This application claims priority to the Chinese Patent Application No. 201510375349.8, filed on Jun. 30, 2015, entitled "MAGNETIC RESONANCE TYPE WIRELESS CHARGING CIRCUIT" which is incorporated herein by reference in its entirety.

TECHNICAL FIELD

The present disclosure relates to the field of wireless charging technology, and in particular, to a magnetic resonance type wireless charging circuit.

BACKGROUND

The wireless charging technology is to supply energy to a device to be charged by a power supply device using inductive coupling without a wire connection between the power supply device and the device to be charged. The wireless charging technology is divided into an electric field coupling type, an electromagnetic induction type, a magnetic resonance type, a radio wave type or the like, according to different implementation principles. A magnetic resonance type wireless charging circuit comprises an energy transmitting apparatus (including a transmitting coil) and an energy receiving apparatus (including a receiving coil), and the transmitting coil and the receiving coil resonate at a particular frequency. In this case, the energy transmitting apparatus and the energy receiving apparatus can exchange energy with each other to achieve wireless charging.

An existing energy transmitting apparatus for magnetic resonance type wireless charging comprises a high frequency oscillation circuit configured to generate a high frequency oscillation signal; a transmitting coil configured to transmit the high frequency oscillation signal; and a power source module configured to supply power to the high frequency oscillation circuit, wherein the high frequency oscillation circuit comprises a switch transistor.

In the process of implementing the present disclosure, the inventor found that the conventional methods at least will incur the following problems.

The performance of the switch transistor in the high frequency oscillation circuit determines a frequency achievable by a transmission signal (i.e., the high frequency oscillation signal). If a switch transistor with good performance is selected for use, a higher frequency can be achieved by the transmission signal, a longer transmission distance of the transmission signal may be achieved, and better effects of wireless charging will be obtained. However, switch transistors with good performance are of high cost, and cannot be easily purchased. Therefore, only switch transistors with low cost and poor performance can be used in general. In this case, the frequency which can be achieved by the transmission signal is low, the transmission distance of the transmission signal is short, and the effects of wireless charging are poor.

SUMMARY

The embodiments of the present disclosure provide a magnetic resonance type wireless charging circuit, comprising:

a high frequency oscillation circuit configured to generate an initial oscillation signal; and a driving circuit configured to generate a transmission signal using the initial oscillation signal, wherein the driving circuit comprises one stage of driving sub-circuit or n stages of driving sub-circuits with (n−1) stages of Direct Current (DC) blocking circuits serially connected thereamong in an alternate manner, where n≥2 and n is an integer, and each stage of driving sub-circuit comprises a frequency doubling circuit and a first frequency selection circuit, which are connected in series.

In a possible implementation of the present disclosure, the first frequency selection circuit comprises a first capacitor and a first inductor, which are connected in parallel;

the first capacitor and the first inductor in an $i^{th}$ stage of driving sub-circuit satisfy the following equation:

$$Li1 * Ci1 = \frac{1}{4^i * (2*\pi*f0)^2},$$

wherein the $i^{th}$ stage of driving sub-circuit is an $i^{th}$ driving sub-circuit connected in series with the high frequency oscillation circuit, where 1≤i≤n and i is an integer, f0 is a frequency of the initial oscillation signal, Li1 is an induction value of the first inductor in the $i^{th}$ stage of driving sub-circuit, and Ci1 is a capacitance value of the first capacitor in the $i^{th}$ stage of driving sub-circuit.

In another possible implementation of the present disclosure, when the driving circuit comprises one stage of driving sub-circuit, the first frequency selection circuit comprises a second capacitor, a second inductor and a DC cancellation circuit; and when the driving circuit comprises n stages of driving sub-circuits with (n−1) stages of DC blocking circuits serially connected thereamong in an alternate manner, where n≥2 and n is an integer, a first frequency selection circuit in an $n^{th}$ stage of driving sub-circuit comprises a second capacitor, a second inductor and a DC cancellation circuit, and the $n^{th}$ stage of driving sub-circuit is an $n^{th}$ driving sub-circuit connected in series with the high frequency oscillation circuit, wherein the DC cancellation circuit is connected to the second capacitor and the second inductor respectively.

Alternatively, the DC cancellation circuit comprises a transformer having two inputs connected to the second capacitor respectively and two outputs connected to the second inductor respectively.

Preferably, when the driving circuit comprises one stage of driving sub-circuit, the second capacitor, the second inductor and the transformer satisfy the following equation:

$$L*C2 = \frac{1}{4*(2*\pi*f0)^2};$$

and when the driving circuit comprises n stages of driving sub-circuits with (n−1) stages of Direct Current (DC) blocking circuits serially connected thereamong in an alternate manner, where n≥2 and n is an integer, the second capacitor, the second inductor and the transformer satisfy the following equation:

$$L*C2 = \frac{1}{4^n*(2*\pi*f0)^2},$$

wherein f0 is a frequency of the initial oscillation signal, L is an equivalent induction value for the second inductor and the transformer connected in parallel, and C2 is a capacitance value of the second capacitor.

In a further possible implementation of the present disclosure, the frequency doubling circuit comprises a first diode, a second diode, a third diode and a fourth diode, wherein the first diode has an anode connected to a cathode of the fourth diode and a cathode connected to a cathode of the second diode, the second diode has an anode connected to a cathode of the third diode, and the third diode has an anode connected to an anode of the fourth diode;

a connection point between the first diode and the second diode in an $i^{th}$ stage of driving sub-circuit and a connection point between the third diode and the fourth diode in the $i^{th}$ stage of driving sub-circuit are connected to the first frequency selection circuit included in the $i^{th}$ stage of driving sub-circuit respectively;

when i=1, a connection point between the first diode and the fourth diode in the $i^{th}$ stage of driving sub-circuit and a connection point between the second diode and the third diode in the $i^{th}$ stage of driving sub-circuit are connected to the high frequency oscillation circuit respectively; and when i≥2, a connection point between the first diode and the fourth diode in the $i^{th}$ stage of driving sub-circuit and a connection point between the second diode and the third diode in the $i^{th}$ stage of driving sub-circuit are connected to a first frequency selection circuit included in an $(i-1)^{th}$ stage of driving sub-circuit respectively, wherein the $i^{th}$ stage of driving sub-circuit is an $i^{th}$ driving sub-circuit connected in series with the high frequency oscillation circuit, wherein 1≤i≤n and i is an integer.

In a further possible implementation of the present disclosure, the driving circuit further comprises:

a second frequency selection circuit connected in series between the high frequency oscillation circuit and the driving sub-circuit and configured to filter the initial oscillation signal.

Alternatively, the second frequency selection circuit comprises a third inductor and a third capacitor, which are connected in series or in parallel; and the third capacitor and the third inductor satisfy the following equation:

$$L3*C3 = \frac{1}{(2*\pi*f0)^2},$$

wherein f0 is a frequency of the initial oscillation signal, L3 is an induction value of the third inductor, and C3 is a capacitance value of the third capacitor.

In a further possible implementation of the present disclosure, the driving circuit further comprises:

a peak cancellation circuit connected to the driving sub-circuit and configured to cancel a peak in an output signal of the driving sub-circuit.

Alternatively, the peak cancellation circuit comprises a fourth capacitor having one terminal connected to the driving sub-circuit and another terminal connected to the ground.

In a further possible implementation of the present disclosure, the DC blocking circuit comprises a fifth capacitor.

BRIEF DESCRIPTION OF THE DRAWINGS

In order to illustrate technical solutions in the embodiments of the present disclosure more clearly, accompanying drawings needed to be used in the description of the embodiments will be described below in brief. Obviously, the accompanying drawings described below are merely some embodiments of the present disclosure. A person having ordinary skill in the art can further acquire other accompanying drawings according to these accompanying drawing without contributing any creative labor.

DETAILED DESCRIPTION

In order to make the purpose, technical solutions and advantages of the present disclosure more clear, the embodiments of the present disclosure will be further described in detail below in conjunction with accompanying drawings.

Figure 1:
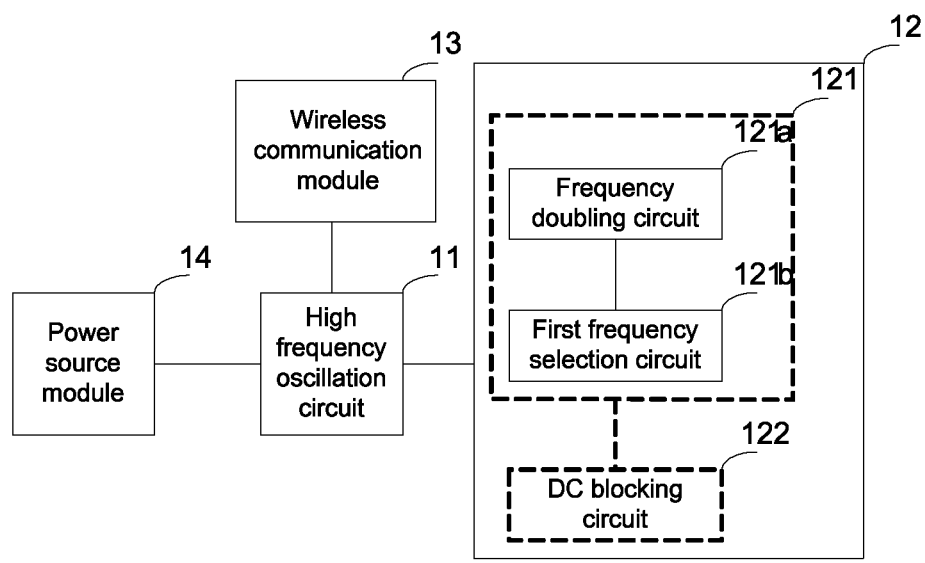
FIG. 1 is a structural diagram of a magnetic resonance type wireless charging circuit according to an embodiment of the present disclosure.
Figure 2:
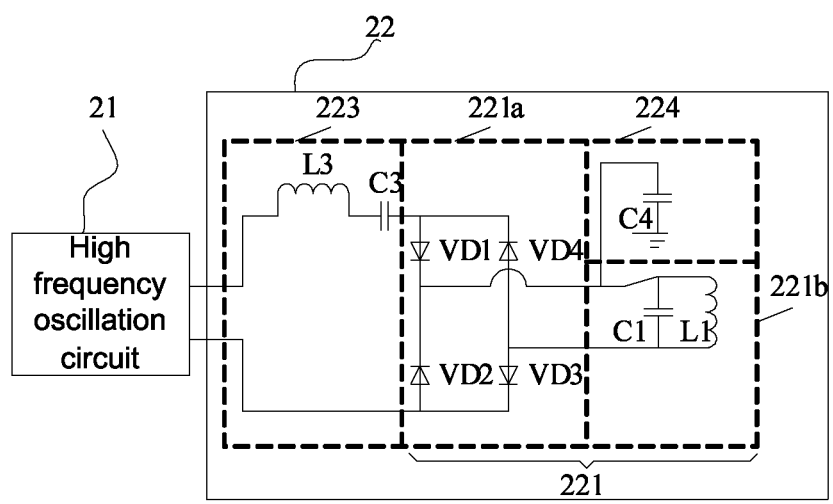
FIG. 2 is a structural diagram of another magnetic resonance type wireless charging circuit according to an embodiment of the present disclosure.
Figure 4:
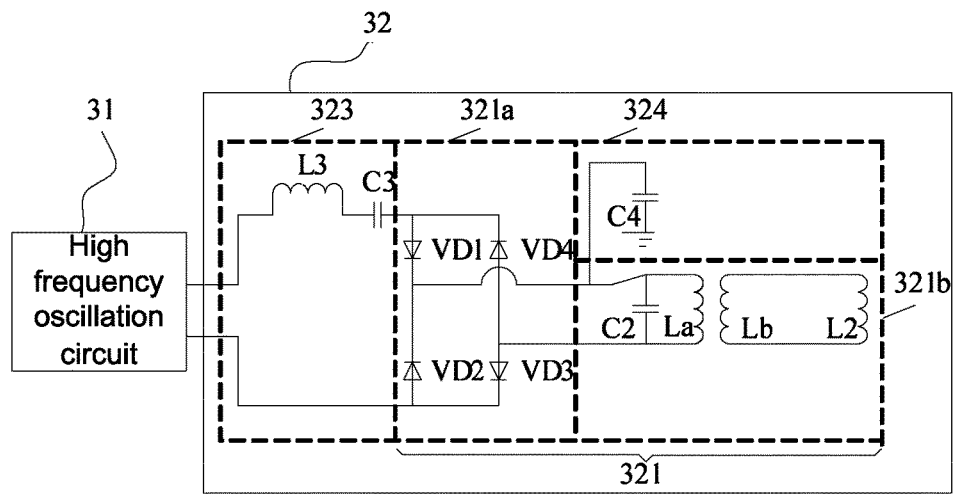
FIG. 4 is a structural diagram of a further magnetic resonance type wireless charging circuit according to an embodiment of the present disclosure.
Figure 5:
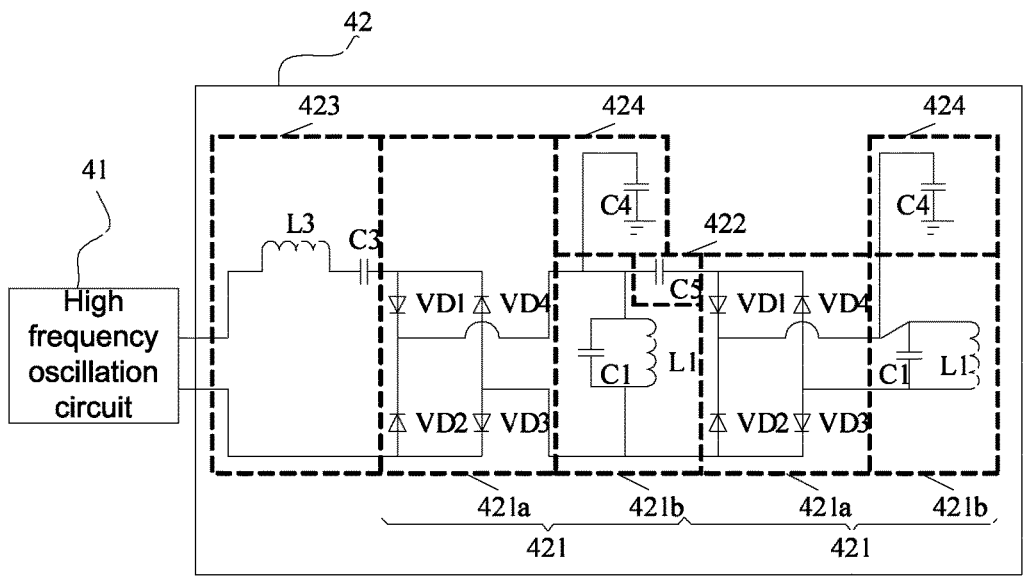
FIG. 5 is a structural diagram of a further magnetic resonance type wireless charging circuit according to an embodiment of the present disclosure.
Figure 6:
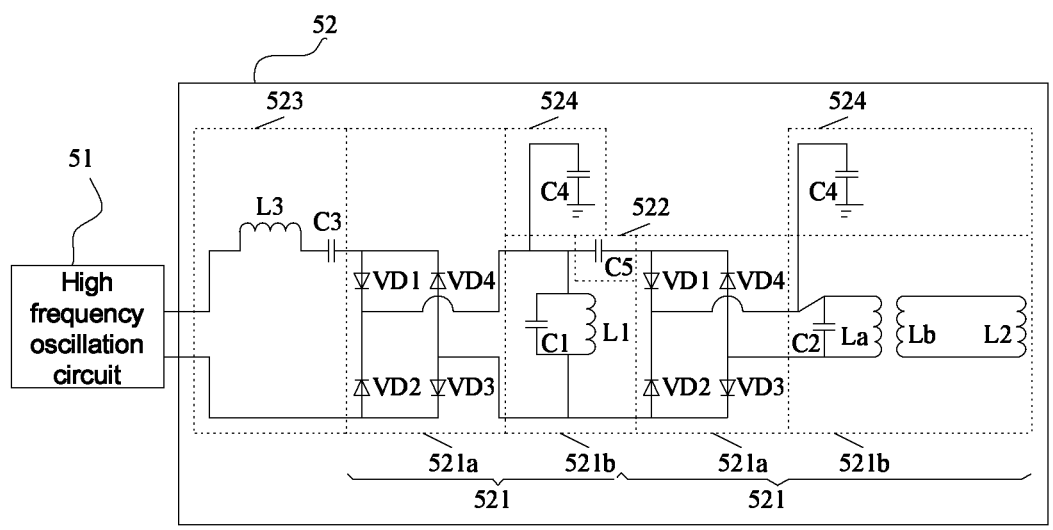
FIG. 6 is a structural diagram of a further magnetic resonance type wireless charging circuit according to an embodiment of the present disclosure.

The embodiments of the present disclosure provide a magnetic resonance type wireless charging circuit, as shown in FIG. 1, comprising:

a high frequency oscillation circuit 11 configured to generate an initial oscillation signal; and a driving circuit 12 configured to generate a transmission signal using the initial oscillation signal, wherein the driving circuit 12 comprises one stage of driving sub-circuit 121 (see the magnetic resonance type wireless charging circuit illustrated in FIGS. 2 and 4 for details) or n stages of driving sub-circuits 121 with (n−1) stages of DC blocking circuits serially connected thereamong in an alternate manner (see the magnetic resonance type wireless charging circuit illustrated in FIGS. 5 and 6 for details), where n≥2 and n is an integer, and each stage of driving sub-circuit 121 comprises a frequency doubling circuit 121a and a first frequency selection circuit 121b, which are connected in series.

The working principle of the magnetic resonance type wireless charging circuit according to the embodiments of the present disclosure will be described below in brief.

After the high frequency oscillation circuit 11 generates an initial oscillation signal, the driving circuit 12 doubles a frequency of the initial oscillation signal to obtain a transmission signal. In the driving circuit 12, each stage of driving sub-circuit 121 doubles the frequency of the input signal and then outputs the frequency doubled signal, and the DC blocking circuit 122 filters out a DC component in an output signal of a previous stage of driving sub-circuit 121 and then transmits the filtered signal to a next stage of driving sub-circuit 121. In each driving sub-circuit 121, the frequency doubling circuit 121a doubles the frequency of the input signal, and the first frequency selection circuit 121b selects the frequency doubled signal from obtained signal.

It is easily understood that with reference to FIG. 1, the magnetic resonance type wireless charging circuit may further comprise a wireless communication module 13 and a power source module 14 which are connected to the high frequency oscillation circuit 11 respectively. The wireless communication module 13 is configured to receive a signal for adjusting a frequency and power of the transmission signal, so that the high frequency oscillation circuit 11 adjusts a frequency and power of the initial oscillation signal according to the received signal. The power source module 14 is configured to supply power to the high frequency oscillation circuit 11.

In the embodiment of the present disclosure, the frequency of the initial oscillation signal generated by the high frequency oscillation circuit is doubled by adding the driving circuit comprising the frequency doubling circuit and the first frequency selection circuit, to obtain a transmission signal with a higher frequency, so as to increase the frequency of the transmission signal and ensure the transmission distance of the transmission signal, thereby ensuring the effects of wireless charging. When the frequency of the transmission signal is required to reach a certain value, the requirements for switch transistors are reduced, and a wireless charging circuit with good effects can be achieved by using cheap switch transistors, thereby reducing the production cost of the wireless charging circuit.

FIG. 2 illustrates another magnetic resonance type wireless charging circuit according to an embodiment of the present disclosure. In the embodiment illustrated in FIG. 2, the driving circuit only comprises one stage of driving sub-circuit. With reference to FIG. 2, the magnetic resonance type wireless charging circuit comprises:

a high frequency oscillation circuit 21 configured to generate an initial oscillation signal; and a driving circuit 22 configured to generate a transmission signal using the initial oscillation signal, wherein the driving circuit 22 comprises one stage of driving sub-circuit 221 and the driving sub-circuit 221 comprises a frequency doubling circuit 221a and a first frequency selection circuit 221b which are connected in series.

It should be illustrated that the frequency of the initial oscillation signal generated by the high frequency oscillation circuit can be doubled by the driving circuit comprising the frequency doubling circuit and the first frequency selection circuit, to obtain a transmission signal with a higher frequency, so as to increase the frequency of the transmission signal and ensure the transmission distance of the transmission signal, thereby ensuring the effects of wireless charging. When the frequency of the transmission signal is required to reach a certain value, the requirements for switch transistors are reduced, and a wireless charging circuit with good effects can be achieved by using cheap switch transistors, thereby reducing the production cost of the wireless charging circuit.

Alternatively, with reference to FIG. 2, the frequency doubling circuit 221a may comprise a first diode VD1, a second diode VD2, a third diode VD3 and a fourth diode VD4, wherein the first diode VD1 has an anode connected to a cathode of the fourth diode VD4 and a cathode connected to a cathode of the second diode VD2, the second diode VD2 has an anode connected to a cathode of the third diode VD3, and the third diode VD3 has an anode connected to an anode of the fourth diode VD4.

A connection point between the first diode VD1 and the second diode VD2 and a connection point between the third diode VD3 and the fourth diode VD4 are connected to the first frequency selection circuit 221b respectively.

A connection point between the first diode VD1 and the fourth diode VD4 and a connection point between the second diode VD2 and the third diode VD3 are connected to the high frequency oscillation circuit 2 lrespectively.

Figure 3:
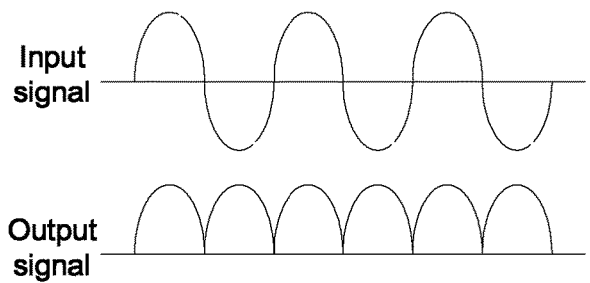
FIG. 3 is a diagram of waveforms of an input signal and an output signal of a frequency doubling circuit according to an embodiment of the present disclosure.

It is easily understood that the first diode VD1, the second diode VD2, the third diode VD3 and the fourth diode VD4 may convert a full-wave signal into a half-wave signal, thereby doubling a frequency of the input signal and then outputting the frequency doubled signal. Specifically, as shown in FIG. 2, when current of the input signal flows from a connection point between the high frequency oscillation circuit 21 and the first diode VD1 to a connection point between the high frequency oscillation circuit 21 and the second diode VD2, the input signal flows through the first diode VD1, the first frequency selection circuit 221b and the third diode VD3 in turn, and an output signal has the same waveform as that of the input signal; and when the current of the input signal flows from the connection point between the high frequency oscillation circuit 21 and the second diode VD2 to the connection point between the high frequency oscillation circuit 21 and the first diode VD1, the input signal flows through the second diode VD2, the first frequency selection circuit 221b and the fourth diode VD4 in turn, and the output signal has an inverse waveform of that of the input signal. With reference to FIG. 3, when the input signal is a sinusoidal wave, the output signal has amplitude equal to an absolute value of that of the sinusoidal wave signal, and the output signal has a frequency which is twice of that of the input signal, thereby doubling the frequency of the input signal.

It can be understood that the frequency doubling circuit 221a is implemented by diodes, and thus has a low cost and can carry a signal with high power.

Specifically, with reference to FIG. 2, the first frequency selection circuit 221b may comprise a first capacitor C1 and a first inductor L1 which are connected in parallel.

It is easily understood that an LC circuit has a function of frequency selection, and the first frequency selection circuit 221b is in a form of the first capacitor C1 and the first inductor L1 which are connected in parallel, which can suppress signals with undesirable frequencies and filter frequencies of signals to obtain a signal with a desired frequency. Further, the first frequency selection circuit 221b is implemented by a capacitor and an inductor, and thus has a low cost and can further carry a high power signal.

Preferably, the first capacitor C1 and the first inductor L1 may satisfy the following equation (1):

$$L11 * C11 = \frac{1}{4^i * (2*\pi*f0)^2} \quad (1)$$

wherein f0 is a frequency of the initial oscillation signal, L11 is an induction value of the first inductor L1, and C11 is a capacitance value of the first capacitor C1.

It is easily understood that the frequency (i.e., resonant frequency) of the signal which is obtained by implementing frequency selection using the first capacitor C1 and the first inductor $$L1 \text{ is } \frac{1}{2*\pi*\sqrt{L11*C11}} = 2*\frac{1}{2*\pi*\sqrt{4*L11*C11}} = 2*f0,$$

thereby selecting a signal of which a frequency is doubled by the frequency doubling circuit 221a and filtering clutter signals with other frequencies can be realized.

In an implementation of the present embodiment, with reference to FIG. 2, the driving circuit 22 may further comprise:

a second frequency selection circuit 223 connected in series between the high frequency oscillation circuit 21 and the driving sub-circuit 221 and configured to filter the initial oscillation signal.

Alternatively, the second frequency selection circuit 223 may comprise a third inductor L3 and a third capacitor C3 which are connected in series (as shown in FIG. 2), or a third inductor and a third capacitor which are connected in parallel. It should be illustrated that the third inductor and the third capacitor which are connected in series are merely taken as an example in FIG. 2, and the present disclosure is not limited thereto.

It is easily understood that an LC circuit has a function of frequency selection, and the second frequency selection circuit 223 comprises the third capacitor and the third inductor which are connected in series or in parallel, thereby signals with undesirable frequencies may be suppressed to obtain a signal with a desired frequency. Further, the second frequency selection circuit 223 is implemented by a capacitor and an inductor, and thus has a low cost and can further carry a signal with high power.

Preferably, the third inductor and the third capacitor may satisfy the following equation (2):

$$L3*C3 = \frac{1}{(2*\pi*f0)^2}; \quad (2)$$

wherein f0 is a frequency of the initial oscillation signal, L3 is an induction value of the third inductor L3, and C3 is a capacitance value of the third capacitor C3.

It is easily understood that the frequency (i.e., resonant frequency) of the signal which is obtained by implementing frequency selection using the third capacitor C3 and the third inductor $$L3 \text{ is } \frac{1}{2*\pi*\sqrt{L3*C3}} = f0,$$

thereby selecting the initial oscillation signal and filtering clutter signals with other frequencies may be realized.

In another implementation of the present embodiment, with reference to FIG. 2, the driving circuit 22 may further comprise:

a peak cancellation circuit 224 connected to the driving sub-circuit 221 and configured to cancel a peak in an output signal of the driving sub-circuit 221.

It can be understood that as frequency doubling is implemented by simple elements in the present disclosure, it is difficult for the frequency doubled signal to have an ideal waveform. The peak in the signal is cancelled by the peak cancellation circuit 224, which can improve idealness of the waveform of the signal.

Alternatively, as shown in FIG. 2, the peak cancellation circuit 224 may comprise a fourth capacitor C4 having one terminal connected to the driving sub-circuit 221 and another terminal connected to the ground.

It is easily understood that the peak has a high frequency, and a resistance of the capacitor relative to a signal with a high frequency is small. One terminal of the fourth capacitor C4 is connected to the driving sub-circuit 221 and another terminal of the fourth capacitor C4 is connected to the ground, in which case a high frequency component (i.e., the peak) in the output signal of the driving sub-circuit 221 can flow to the ground through the fourth capacitor C4, thereby avoiding the peak from being output and canceling the peak from the output signal of the driving sub-circuit 221.

FIG. 4 illustrates a further magnetic resonance type wireless charging circuit according to an embodiment of the present disclosure. The magnetic resonance type wireless charging circuit in the embodiment illustrated in FIG. 4 is substantially the same as the magnetic resonance type wireless charging circuit in the embodiment illustrated in FIG. 2, except that structures of the first frequency selection circuits in FIGS. 2 and 4 are different.

Specifically, with reference to FIG. 4, the first frequency selection circuit 321b may comprise a second capacitor C2, a second inductor L2, and a DC cancellation circuit. The DC cancellation circuit is connected to the second capacitor C2 and the second inductor L2 respectively, and is configured to cancel a DC component in the transmission signal.

It is easily understood that if there is a DC component in the transmission signal, the DC component may form a strong magnetic field through a transmission coil (the second inductor L2 in FIG. 4), which may influence the entire circuit. The DC component in the transmission signal is cancelled by the DC cancellation circuit, which can avoid the DC component from influencing a normal operation of the circuit through the magnetic field formed via the transmission coil.

Alternatively, the DC cancellation circuit may comprise a transformer having two inputs connected to the second capacitor C2 respectively and two outputs connected to the second inductor L2 respectively.

Specifically, with reference to FIG. 4, the transformer may comprise two inductors La and Lb which are coupled, and thus has a low cost and can carry a signal with high power.

It is easily understood that primary and secondary coils (the inductors La and Lb) of the transformer are coupled together through a closed magnetic core, the magnetic field formed by the DC component is constrained in the magnetic core, and only Alternative Current (AC) components can be transmitted between the primary and secondary coils of the transformer. Therefore, the DC component in the transmission signal can be cancelled.

Preferably, the second capacitor C2, the second inductor L2 and the transformer may satisfy the following equation (3):

$$L*C2 = \frac{1}{4*(2*\pi*f0)^2}; \quad (3)$$

wherein f0 is a frequency of the initial oscillation signal, L is an equivalent induction value for the second inductor L2 and the transformer that are connected in parallel, and C2 is a capacitance value of the second capacitor C2.

It is easily understood that the frequency (i.e., resonant frequency) of the signal which is obtained by implementing frequency selection using an equivalent inductor formed by the second inductor L2 and the transformer which are connected in parallel and the second capacitor $$C2 \text{ is } \frac{1}{2*\pi*\sqrt{L*C2}} = 2*f0,$$

thereby selecting a signal of which a frequency is doubled by the frequency doubling circuit 321a and filtering clutter signals with other frequencies can be realized.

FIG. 5 illustrates a further magnetic resonance type wireless charging circuit according to an embodiment of the present disclosure. In the embodiment illustrated in FIG. 5, the driving circuit comprises two stages of driving sub-circuits. With reference to FIG. 5, the magnetic resonance type wireless charging circuit comprises:

a high frequency oscillation circuit 41 configured to generate an initial oscillation signal; and a driving circuit 42 configured to generate a transmission signal using the initial oscillation signal;

wherein the driving circuit 42 comprises n stages of driving sub-circuits 421 with (n−1) stages of DC blocking circuits 422 serially connected thereamong in an alternate manner, where n=2, and each stage of driving sub-circuit 421 comprises a frequency doubling circuit 421a and a first frequency selection circuit 421b which are connected in series.

It should be illustrated that the frequency of the initial oscillation signal generated by the high frequency oscillation circuit can at least be quadruplicated by the driving circuit comprising multiple frequency doubling circuits and multiple first frequency selection circuits, to obtain a transmission signal with a higher frequency, so as to increase the frequency of the transmission signal and ensure the transmission distance of the transmission signal, thereby ensuring the effects of wireless charging. When the frequency of the transmission signal is required to reach a certain value, the requirements for switch transistors are reduced, and a wireless charging circuit with good effects can be achieved by using cheap switch transistors, thereby reducing the production cost of the wireless charging circuit.

Alternatively, the DC blocking circuit 422 may comprise a fifth capacitor C5.

It is easily understood that the capacitor has characteristics of DC blocking and AC passing. The fifth capacitor C5 is arranged between two stages of driving sub-circuits 421, which can cancel a DC component in a half-wave signal obtained by a previous stage of driving sub-circuit 421 to provide a full-wave signal to a next stage of driving sub-circuit 421 for rectification, thereby achieving frequency doubling. Further, the DC blocking circuit 422 is implemented by using the fifth capacitor C5, and thus has a low cost and can carry a signal with high power.

It should be illustrated that the DC blocking circuit 422 may also be implemented in other manners. For example, the DC blocking circuit 422 may be implemented by a capacitor and a resistor which are connected in series, or may also be implemented by a capacitor and a resistor that are parallel connected and in turn connected in series with a diode, which is not limited in the present disclosure.

Alternatively, with reference to FIG. 5, the frequency doubling circuit 421a may comprise a first diode VD1, a second diode VD2, a third diode VD3 and a fourth diode VD4, wherein the first diode VD1 has an anode connected to a cathode of the fourth diode VD4 and a cathode connected to a cathode of the second diode VD2, the second diode VD2 has an anode connected to a cathode of the third diode VD3, and the third diode VD3 has an anode connected to an anode of the fourth diode VD4.

A connection point between the first diode VD1 and the second diode VD2 in an $i^{th}$ stage of driving sub-circuit 421 and a connection point between the third diode VD3 and the fourth diode VD4 in the $i^{th}$ stage of driving sub-circuit 421 are connected to a first frequency selection circuit 421b included in the $i^{th}$ stage of driving sub-circuit 421 respectively.

When i=1, the connection point between the first diode VD1 and the fourth diode VD4 in the $i^{th}$ stage of driving sub-circuit 421 and the connection point between the second diode VD2 and the third diode VD3 in the $i^{th}$ stage of driving sub-circuit 421 are connected to the high frequency oscillation circuit 41 respectively; and when i≥2, the connection point between the first diode VD1 and the fourth diode VD4 in the $i^{th}$ stage of driving sub-circuit 421 and the connection point between the second diode VD2 and the third diode VD3 in the $i^{th}$ stage of driving sub-circuit 421 are connected to a first frequency selection circuit 421b included in an $(i-1)^{th}$ stage of driving sub-circuit 421 respectively, wherein the $i^{th}$ stage of driving sub-circuit 421 is an $i^{th}$ driving sub-circuit 421 which is connected in series with the high frequency oscillation circuit 41, wherein 1≤i≤n and i is an integer.

It can be understood that the frequency doubling circuit is implemented by using diodes, and thus has a low cost and can further carry a signal with high power.

Specifically, with reference to FIG. 5, the first frequency selection circuit 421b may comprise a first capacitor C1 and a first inductor L1 which are connected in parallel.

Preferably, a first capacitor C1 and a first inductor L1 in the $i^{th}$ stage of driving sub-circuit 421 may satisfy the following equation (4):

$$Li1*Ci1 = \frac{1}{4^i*(2*\pi*f0)^2} \qquad (4)$$

wherein, the $i^{th}$ stage of driving sub-circuit 421 is an $i^{th}$ driving sub-circuit 421 which is connected in series with the high frequency oscillation circuit 41, where 1≤i≤n and i is an integer, f0 is a frequency of the initial oscillation signal, Li1 is an induction value of the first inductor L1 in the $i^{th}$ stage of driving sub-circuit 421, and Ci1 is a capacitance value of the first capacitor C1 in the $i^{th}$ stage of driving sub-circuit 421.

In an implementation of the present embodiment, with reference to FIG. 5, the driving circuit 42 may further comprise:

a second frequency selection circuit 423 connected in series between the high frequency oscillation circuit 41 and the driving sub-circuit 421 and configured to filter the initial oscillation signal.

Alternatively, the second frequency selection circuit 423 may comprise a third inductor L3 and a third capacitor C3 which are connected in series (as shown in FIG. 5) or a third inductor and a third capacitor which are connected in parallel. It should be illustrated that the third inductor and the third capacitor which are connected in series are taken as an example in FIG. 5, and the present disclosure is not limited thereto.

Preferably, the third inductor and the third capacitor may satisfy the equation (2).

In another implementation of the present embodiment, with reference to FIG. 5, the driving circuit 42 may further comprise:

a peak cancellation circuit 424 connected to the driving sub-circuit 421 and configured to cancel a peak in an output signal of the driving sub-circuit 421.

Alternatively, as shown in FIG. 5, the peak cancellation circuit 424 may comprise a fourth capacitor C4 having one terminal connected to the driving sub-circuit 421 and another terminal connected to the ground. In addition, the peak may also be cancelled by means of a choking coil, and it only needs to set suitable parameters. In consideration of a higher frequency of an electrical signal to be processed, the choking coil may not use a magnetic core if necessary.

It should be illustrated that in the present embodiment, the driving circuit comprising two stages of driving sub-circuits is merely taken as an example, and in other embodiments, the driving circuit may also comprise at least three stages of driving sub-circuits, and in this case, it only needs to substitute n=2 with a corresponding number of stages.

FIG. 6 illustrates a further magnetic resonance type wireless charging circuit according to an embodiment of the present disclosure. The magnetic resonance type wireless charging circuit in the embodiment illustrated in FIG. 6 is substantially the same as the magnetic resonance type wireless charging circuit in the embodiment illustrated in FIG. 5, except that structures of the first frequency selection circuits in FIGS. 5 and 6 are different.

Specifically, with reference to FIG. 6, a first frequency selection circuit 521b in an $n^{th}$ stage of driving sub-circuit 521 may comprise a second capacitor C2, a second inductor L2 and a DC cancellation circuit. The $n^{th}$ stage of driving sub-circuit 521 is an $n^{th}$ driving sub-circuit 521 which is connected in series with a high frequency oscillation circuit 51. The DC cancellation circuit is connected to the second capacitor C2 and the second inductor L2 respectively, and is configured to cancel a DC component in the transmission signal.

Alternatively, the DC cancellation circuit may comprise a transformer having two inputs connected to the second capacitor C2 respectively and two outputs connected to the second inductor L2 respectively.

Specifically, with reference to FIG. 6, the transformer may comprise two inductors La and Lb which are coupled, and thus has a low cost and can carry a signal with high power.

Preferably, the second capacitor C2, the second inductor L2 and the transformer may satisfy the following equation (5):

$$L*C2 = \frac{1}{4^n * (2*\pi*f0)^2}; \quad (5)$$

wherein f0 is a frequency of the initial oscillation signal, L is an equivalent induction value for the second inductor L2 and the transformer that are connected in parallel, and C2 is a capacitance value of the second capacitor C2.

It is easily understood that the frequency (i.e., resonant frequency) of the signal which is obtained by implementing frequency selection using an equivalent inductor formed by the second inductor L2 and the transformer which are connected in parallel and the second capacitor C2 is $\frac{1}{2*\pi*\sqrt{L*C2}} = 2^n * f0$, thereby selecting a signal of which a frequency is doubled by n frequency doubling circuits 521a and filtering clutter signals with other frequencies can be realized.

It should be illustrated that in the present embodiment, the driving circuit comprising two stages of driving sub-circuits is merely taken as an example, and in other embodiments, the driving circuit may also comprise at least three stages of driving sub-circuits, and in this case, it only needs to substitute n=2 with a corresponding number of stages.

The beneficial effects of the technical solutions according to the embodiments of the present disclosure are as follows. The frequency of the initial oscillation signal generated by the high frequency oscillation circuit is doubled by adding the driving circuit comprising the frequency doubling circuit and the first frequency selection circuit, to obtain a transmission signal with a higher frequency, so as to increase the frequency of the transmission signal and ensure the transmission distance of the transmission signal, thereby ensuring the effects of wireless charging. When the frequency of the transmission signal is required to reach a certain value, the requirements for switch transistors are reduced, and a wireless charging circuit with good effects can be achieved by using cheap switch transistors, thereby reducing the production cost of the wireless charging circuit.

The above description is merely preferable embodiments of the present disclosure instead of limiting the present disclosure. Any modification, equivalent substitution, improvement or the like, which is made within the spirit and principle of the present disclosure, should be included in the protection scope of the present disclosure.

I claim:

1. A magnetic resonance type wireless charging circuit, comprising:
   a high frequency oscillation circuit configured to generate an initial oscillation signal; and
   a driving circuit connected to the high frequency oscillation circuit and configured to generate a transmission signal using the initial oscillation signal,
   wherein the driving circuit comprises one stage of driving sub-circuit and the driving sub-circuit comprises a frequency doubling circuit, and a first frequency selection circuit, which are connected in series.

2. The magnetic resonance type wireless charging circuit according to claim 1, wherein the first frequency selection circuit comprises a first capacitor and a first inductor, which are connected in parallel;
   the first capacitor and the first inductor satisfy the following equation:

$$L11*C11 = \frac{1}{4*(2*\pi*f0)^2},$$

wherein f0 is a frequency of the initial oscillation signal, L11 is an induction value of the first inductor in the driving sub-circuit, and C11 is a capacitance value of the first capacitor in driving sub-circuit.

3. The magnetic resonance type wireless charging circuit according to claim 1, wherein
   the first frequency selection circuit comprises a second capacitor, a second inductor and a DC cancellation circuit;
   wherein the DC cancellation circuit is connected to the second capacitor and the second inductor respectively.

4. The magnetic resonance type wireless charging circuit according to claim 3, wherein the DC cancellation circuit comprises a transformer having two inputs connected to two terminals of the second capacitor respectively and two outputs connected to two terminals of the second inductor respectively.

5. The magnetic resonance type wireless charging circuit according to claim 4, wherein
the second capacitor, the second inductor and the transformer satisfy the following equation:

$$L*C2 = \frac{1}{4^n*(2*\pi*f0)^2}$$

wherein f0 is a frequency of the initial oscillation signal, L is an equivalent induction value for the second inductor and the transformer connected in parallel, and C2 is a capacitance value of the second capacitor.

6. The magnetic resonance type wireless charging circuit according to claim 1, wherein the frequency doubling circuit comprises a first diode, a second diode, a third diode and a fourth diode, wherein the first diode has an anode connected to a cathode of the fourth diode and a cathode connected to a cathode of the second diode, the second diode has an anode connected to a cathode of the third diode, and the third diode has an anode connected to an anode of the fourth diode;
a connection point between the first diode and the second diode in the driving sub-circuit and a connection point between the third diode and the fourth diode in the driving sub-circuit are connected to the first frequency selection circuit included in the driving sub-circuit respectively;
a connection point between the first diode and the fourth diode in the the driving sub-circuit and a connection point between the second diode and the third diode in the driving sub-circuit are connected to the high frequency oscillation circuit respectively,
wherein the driving sub-circuit is connected in series with the high frequency oscillation circuit.

7. The magnetic resonance type wireless charging circuit according to claim 1, wherein the driving circuit further comprises:
a second frequency selection circuit connected in series between the high frequency oscillation circuit and the driving sub-circuit and configured to filter the initial oscillation signal.

8. The magnetic resonance type wireless charging circuit according to claim 7, wherein the second frequency selection circuit comprises a third inductor and a third capacitor, which are connected in series or in parallel.

9. The magnetic resonance type wireless charging circuit according to claim 1, wherein the driving circuit further comprises:
a peak cancellation circuit connected to the driving sub-circuit and configured to cancel a peak in an output signal of the driving sub-circuit.

10. The magnetic resonance type wireless charging circuit according to claim 9, wherein the peak cancellation circuit comprises a fourth capacitor having one terminal connected to the driving sub-circuit and another terminal connected to the ground.

11. The magnetic resonance type wireless charging circuit according to claim 1, wherein the DC blocking circuit comprises a fifth capacitor.

12. The magnetic resonance type wireless charging circuit according to claim 8, wherein the third capacitor and the third inductor satisfy the following equation:

$$L3*C3 = \frac{1}{(2*\pi*f0)^2},$$

wherein f0 is a frequency of the initial oscillation signal, L3 is an induction value of the third inductor, and C3 is a capacitance value of the third capacitor.

13. A magnetic resonance type wireless charging circuit, comprising:
a high frequency oscillation circuit configured to generate an initial oscillation signal; and
a driving circuit connected to the high frequency oscillation circuit and configured to generate a transmission signal using the initial oscillation signal,
wherein the driving circuit comprises n stages of driving sub-circuits with(n−1) stages of Direct Current (DC) blocking circuits serially connected thereamong in an alternate manner, where n≥2 and n is an integer, and the driving sub-circuit comprises a frequency doubling circuit and a first frequency selection circuit, which are connected in series.

14. The magnetic resonance type wireless charging circuit according to claim 13, wherein the first frequency selection circuit comprises a first capacitor and a first inductor, which are connected in parallel;
the first capacitor and the first inductor in an $i^{th}$ stage of driving sub-circuit satisfy the following equation:

$$Li1*Ci1 = \frac{1}{4^i*(2*\pi*f0)^2},$$

wherein the $i^{th}$ stage of driving sub-circuit is an $i^{th}$ driving sub-circuit connected in series with the high frequency oscillation circuit, where 2≤i≤n and I is an integer, f0 is a frequency of the initial oscillation signal, Li1 is an induction value of the first inductor in the $i^{th}$ stage of driving sub-circuit, and Ci1 is a capacitance value of the first capacitor in the $i^{th}$ stage of driving sub-circuit.

15. The magnetic resonance type wireless charging circuit according to claim 13, wherein the first frequency selection circuit in an $n^{th}$ stage of driving sub-circuit comprises a second capacitor, a second inductor and a DC cancellation circuit, and the $n^{th}$ stage of driving sub-circuit is an $n^{th}$ driving sub-circuit connected in series with the high frequency oscillation circuit,
wherein the DC cancellation circuit is connected to the second capacitor and the second inductor respectively.

16. The magnetic resonance type wireless charging circuit according to claim 15, wherein the DC cancellation circuit comprises a transformer having two inputs connected to two terminals of the second capacitor respectively and two outputs connected to two terminals of the second inductor respectively.

17. The magnetic resonance type wireless charging circuit according to claim 16, wherein the second capacitor, the second inductor and the transformer satisfy the following equation:

$$L*C2 = \frac{1}{4^n*(2*\pi*f0)^2}$$

wherein f0 is a frequency of the initial oscillation signal, L is an equivalent induction value for the second inductor and the transformer connected in parallel, and C2 is a capacitance value of the second capacitor.

18. The magnetic resonance type wireless charging circuit according to claim 13, wherein the frequency doubling circuit comprises a first diode, a second diode, a third diode and a fourth diode, wherein the first diode has an anode connected to the cathode of the fourth diode and the cathode connected to a cathode of the second diode, the second diode has an anode connected to a cathode of the third diode, and the third diode has an anode connected to an anode of the fourth diode;
- a connection point between the first diode and the second diode in an $i^{th}$ stage of driving sub-circuit and a connection point between the third diode and the fourth diode in the $i^{th}$ stage of driving sub-circuit are connected to the first frequency selection circuit included in the $i^{th}$ stage of driving sub-circuit;
- a connection point between the first diode and the fourth diode in the $i^{th}$ stage of driving sub-circuit and a connection point between the second diode and the third diode in the $i^{th}$ stage of driving sub-circuit are connected to a first frequency selection circuit included in an $(i-1)^{th}$ stage of driving sub-circuit respectively,
- wherein the $i^{th}$ stage of driving sub-circuit is an $i^{th}$ driving sub-circuit connected in series with the high frequency oscillation circuit, wherein 2≤i≤n and I is an integer.

19. The magnetic resonance type wireless charging circuit according to claim 13, wherein the driving circuit further comprises:
- a second frequency selection circuit connected in series between the high frequency oscillation circuit and the driving sub-circuit and configured to filter the initial oscillation signal.

20. The magnetic resonance type wireless charging circuit according to claim 19, wherein the second frequency selection circuit comprises a third inductor and a third capacitor, which are connected in series or in parallel.

21. The magnetic resonance type wireless charging circuit according to claim 20, wherein the third capacitor and the third inductor satisfy the following equation:

$$L3 * C3 = \frac{1}{(2*\pi*f0)^2},$$

wherein f0 is a frequency of the initial oscillation signal, L3 is an induction value of the third inductor, and C3 is a capacitance value of the third capacitor.

22. The magnetic resonance type wireless charging circuit according to claim 13, wherein the driving circuit further comprises:
- a peak cancellation circuit connected to the driving sub-circuit and configured to cancel a peak in an output signal of the driving sub-circuit.

23. The magnetic resonance type wireless charging circuit according to claim 22, wherein the peak cancellation circuit comprises a fourth capacitor having one terminal connected to the driving sub-circuit and another terminal connected to the ground.

24. The magnetic resonance type wireless charging circuit according to claim 13, wherein the DC blocking circuit comprises a fifth capacitor.

* * * * *